(12) United States Patent
Kikuchi

(10) Patent No.: US 6,229,597 B1
(45) Date of Patent: May 8, 2001

(54) OBJECT DETECTING DEVICE

(75) Inventor: Hayato Kikuchi, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/353,281

(22) Filed: Jul. 14, 1999

(30) Foreign Application Priority Data

Jul. 15, 1998 (JP) .................................................. 10-200035

(51) Int. Cl.[7] ................................ B60T 7/16; G01C 3/08; G01B 11/26; G01S 13/08
(52) U.S. Cl. ........................ 356/4.01; 180/169; 342/139; 342/146; 356/5.01; 356/141.1
(58) Field of Search .................................... 342/139, 140, 342/146, 94, 195, 136, 141; 356/4.01, 5.01, 5.15, 141.1–141.5; 180/169

(56) References Cited

U.S. PATENT DOCUMENTS

| | | | |
|---|---|---|---|
| 4,477,184 | * | 10/1984 | Endo . |
| 4,518,256 | * | 5/1985 | Schwartz . |
| 4,632,543 | * | 12/1986 | Endo . |
| 5,114,226 | * | 5/1992 | Goodwin et al. . |
| 5,760,886 | * | 6/1998 | Miyazaki et al. ............... 356/5.01 |
| 6,097,476 | * | 8/2000 | Kato et al. ...................... 356/4.01 |
| 6,122,040 | * | 9/2000 | Arita et al. ...................... 356/4.01 |

* cited by examiner

Primary Examiner—Stephen C. Buczinski
(74) Attorney, Agent, or Firm—Arent Fox Kintner Plotkin & Kahn, PLLC

(57) ABSTRACT

An area is divided by a plurality of parallel lines parallel to a vehicle body axis CL of a vehicle V, into fifteen detection areas K1 to K15 each having a width of 1.6 m, and each of the detection areas K1 to K15 is divided by a distance address at a distance of every 0.5 m to define a large number of measure-shaped regions. It is determined whether a target T exists in any of the regions, by adding together received reception level signals of laser beams reflected in the regions and comparing a value resulting from the adding with a threshold value. The widths of the detection areas K1 to K15 assume a constant value irrespective of distance to the target and hence, even when the target T exists at a point closer to the vehicle, the reception level signals of waves reflected from a wider area of the target T can be added together, leading to an enhanced detecting ability.

9 Claims, 14 Drawing Sheets

VERTICAL AND LATERAL SCANNING
BY TRANSMITTED BEAM

OBJECT DETECTING DEVICE

BACKGROUND OF THE INVENTION

1. Field of the Invention

The present invention relates to an object detecting device for detecting an object by transmitting an electromagnetic wave comprising a laser or a millimeter wave to the object and receiving the reflected wave thereof.

2. Description of the Related Art

FIG. 14 shows a prior art object detecting device for detecting the distance from a vehicle to another vehicle T traveling ahead of the vehicle (which will be referred to as a preceding vehicle) and the direction of the preceding vehicle. The prior art object detecting device is designed to detect the distance and direction of the preceding vehicle T by vertically and laterally scanning with an electromagnetic wave transmitted forwards from a radar device provided at a front portion of the vehicle V and receiving the wave reflected by the preceding vehicle T.

In the above prior art device, the electromagnetic wave transmitted forwards from the radar device is diffused radiantly. For this reason, the width of the area for detecting the preceding vehicle T is narrower at a location closer to the vehicle V and wider at a location farther from the vehicle V. For example, in an object detecting device having a maximum detecting distance of 100 m, if the width of an area equal to 0.8 m which is approximately one-half of the lateral width of the preceding vehicle T, is ensured at a location 100 m ahead of the vehicle V, the width of the area is as small as 0.08 m at a location 10 m ahead of the vehicle V and hence, the reflected wave cannot be received with the preceding vehicle defined as a lump of object. For this reason, when distance from the vehicle V to the preceding vehicle T is farther, the preceding vehicle T can be detected. However, when the distance becomes short, only the reflected wave from a portion of a vehicle body of the preceding vehicle T is received. If the reflection state of the electromagnetic wave reflected from such portion of the vehicle body is bad, there is a possibility that the preceding vehicle could not be detected.

SUMMARY OF THE INVENTION

Accordingly, it is an object of the present invention to provide an object detecting device, wherein an object can be reliably detected irrespective of the magnitude of a distance from the vehicle to the object.

To achieve the above object, according to a first aspect and feature of the present invention, there is provided an object detecting device for detecting an object by transmitting an electromagnetic wave, and receiving a reflected wave produced by reflection of the electromagnetic wave from the object. The device comprises a transmitting and receiving means for conducting the transmission of an electromagnetic wave and the reception of the reflected wave in each of a plurality of small areas into which an area for detecting the object is divided, an adding means for adding signals indicative of reception levels of the reflected waves in a plurality of basic areas defined by grouping adjacent ones of the small areas each having a predetermined lateral width, in accordance with a time lag from the transmission to the reception of the waves, and object detecting means for detecting a distance from the object detecting device to the object, based on the result of addition by the adding means.

With the above arrangement, the plurality of basic areas are formed by grouping the adjacent smaller areas to establish the predetermined lateral width, and the distance from the vehicle to the object is detected based on the result of the addition of the reception level signals of the reflected waves in the basic areas in accordance with the time lag from the transmission to the reception of such waves. Therefore, it is possible to reliably detect the distance from the vehicle to the object irrespective of the magnitude of the distance by adding together the reception level signals from a sufficiently wide area which covers the entire object. Even when the reception level signals of the reflected waves in the small areas, are small because it is difficult for the object to reflect the electromagnetic wave, it is possible to reliably detect the object in the entire basic area comprising the plurality of small areas grouped together. Moreover, since the detection is carried out based on the added reception level signals of the reflected waves, the influence of the rain or snow at random distances to the reflected waves can be eliminated, whereby the distance from the vehicle to the object can be reliably detected.

The predetermined lateral width is set at 0.8 m in the disclosed embodiment, but such value is a matter of design, which may be changed as desired in accordance with the size of an object to be detected. In a first embodiment, a beam transmitting section 1, a transmitted-beam scanning section 2, a beam receiving section 3 and a received-beam scanning section 4 form the transmitting and receiving means. In a second embodiment, the beam transmitting section 1, the transmitted-beam scanning section 2, the beam receiving section 3 and a transmitted and received-beam scanning section 4' form the transmitting and receiving means.

According to a second aspect and feature of the present invention, the transmitting and receiving means transmits electromagnetic waves sequentially in a lateral direction, and the object detecting means detects a lateral position of the object based on the timing of transmission of the electromagnetic waves to the small areas.

With the above arrangement, the transmitting and receiving means transmits the electromagnetic waves sequentially in the lateral direction, and therefore, the lateral position of the object detected by the electromagnetic waves can be detected based on the timing of transmission of the electromagnetic waves by the transmitting and receiving means.

According to a third aspect and feature of the present invention, a plurality of detection areas are established by grouping adjacent ones of the plurality of basic areas together, and the adding means adds the signals indicative of reception levels of the reflected waves in the detection areas in accordance with the time lag from the transmission to the reception of such waves.

With the above arrangement, since the plurality of detection areas are established by grouping adjacent plurality of basic areas, the reception level signals of the reflected waves from the detection areas each having any area such as to cover an object depending on the size of the object, are added together, whereby the distance from the vehicle to the object can be reliably detected.

According to a fourth aspect and feature of the present invention, the object detecting means detects the lateral position of the object based on the lateral position of a detection area in which the object has been detected.

With the above arrangement, the lateral position of each of the detection areas is previously determined in accordance with the combination of the basic areas and hence, the lateral position of the object can be detected based on the lateral position of the detection area in which the object has been detected.

According to a fifth aspect and feature of the present invention, the plurality of detection areas are established in such a manner that the detection areas are overlapped by one half by sequentially grouping the adjacent two basic areas.

With the above arrangement, the plurality of detection areas are established in such a manner that they are overlapped by one half by sequentially grouping the adjacent two basic areas. Therefore, even when an object exists astride the two basic areas, the object can be reliably detected through the covering-up by any detection area.

According to a sixth aspect and feature of the present invention, the object detecting device is mounted on a vehicle to detect an object existing ahead of the vehicle in the direction of movement of the vehicle, and the lateral width of the detection area is set based on the lateral width of the vehicle or the width of a lane of the road on which the vehicle is traveling.

With the above arrangement, since the lateral width of the detection area is set based on the lateral width of the vehicle or the width of the lane, the detection area having an appropriate size depending on the size of a preceding vehicle can be set, whereby the preceding vehicle can be reliably detected.

According to a seventh aspect and feature of the present invention, the lateral width of the detection area is set to be substantially equal to the lateral width of the vehicle or the width of the lane.

With the above arrangement, since the lateral width of the detection area is set to be substantially equal to the lateral width of the vehicle or the width of the lane, the entire preceding vehicle can be reliably detected through the covering-up by the detection area.

The above and other objects, features and advantages of the invention will become apparent from the following description of the preferred embodiment taken in conjunction with the accompanying drawings.

BRIEF DESCRIPTION OF THE DRAWINGS

FIGS. 1 to 9 show a first embodiment of the present invention, wherein

FIG. 1 is a block diagram of an object detecting device according to the first embodiment of the present invention;

FIG. 2 is a perspective view of the object detecting device;

FIG. 3 is an illustration for explaining a scanning method;

FIG. 4 is a diagram for explaining a scanning method;

FIG. 5 is a block diagram of an essential portion of the object detecting device;

FIG. 6 is a diagram for explaining basic areas and detection areas;

FIG. 7 is an enlarged diagram of a portion 7 shown in FIG. 6;

FIG. 8 is a first portion of a flow chart for explaining the operation according to the first embodiment of the present invention;

FIG. 9 is a second portion of the flow chart for explaining the operation;

FIGS. 10 to 13 show a second embodiment of the present invention, wherein

FIG. 10 is a block diagram of an object detecting device of the present invention;

FIG. 11 is a perspective view of the object detecting device;

FIG. 12 is an illustration for explaining a scanning method;

FIG. 13 is a diagram for explaining a scanning method;

DESCRIPTION OF THE PREFERRED EMBODIMENTS

A first embodiment of the present invention will now be described with reference to FIGS. 1 to 9.

Figure 1:
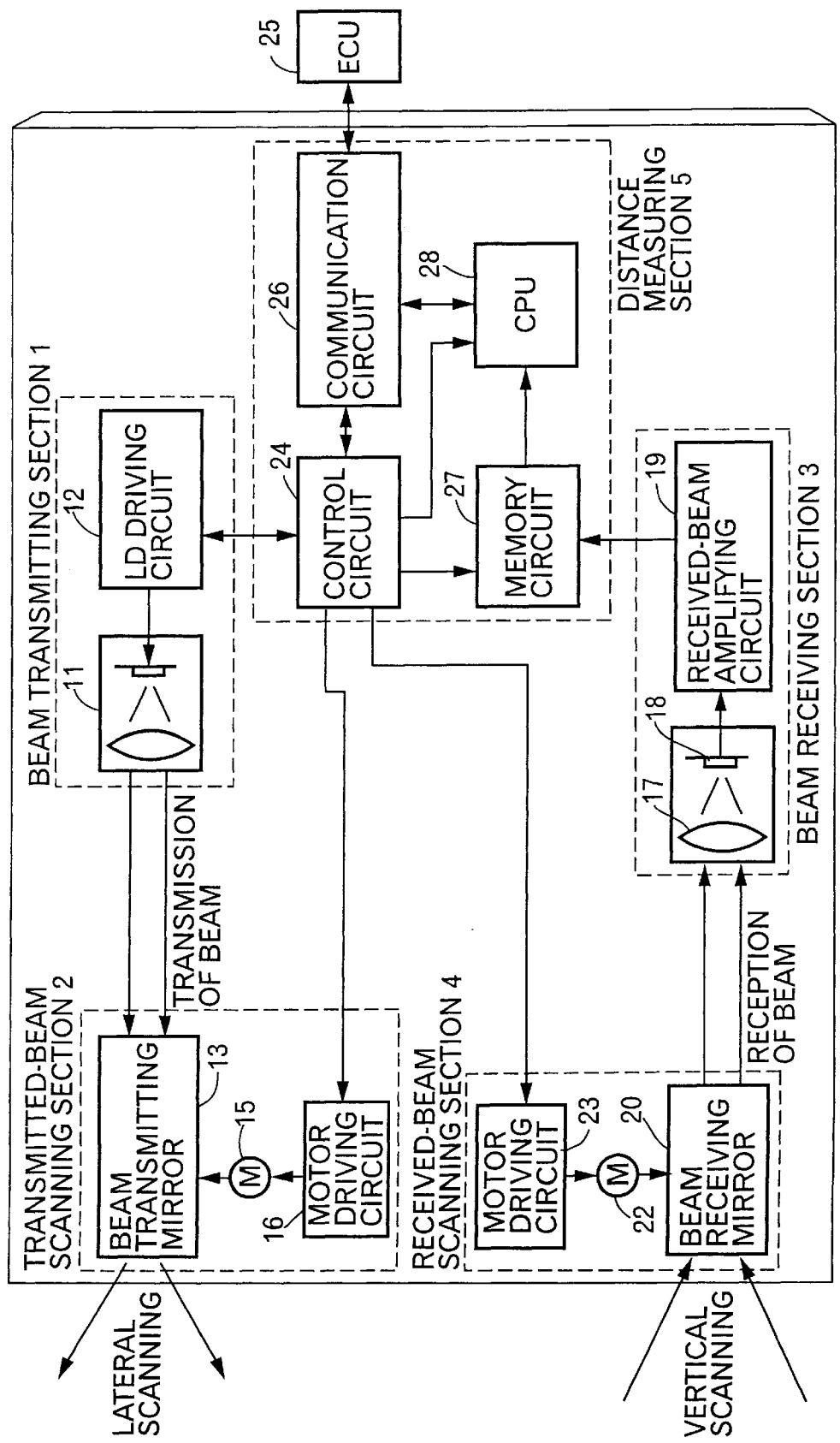
Figure 2:
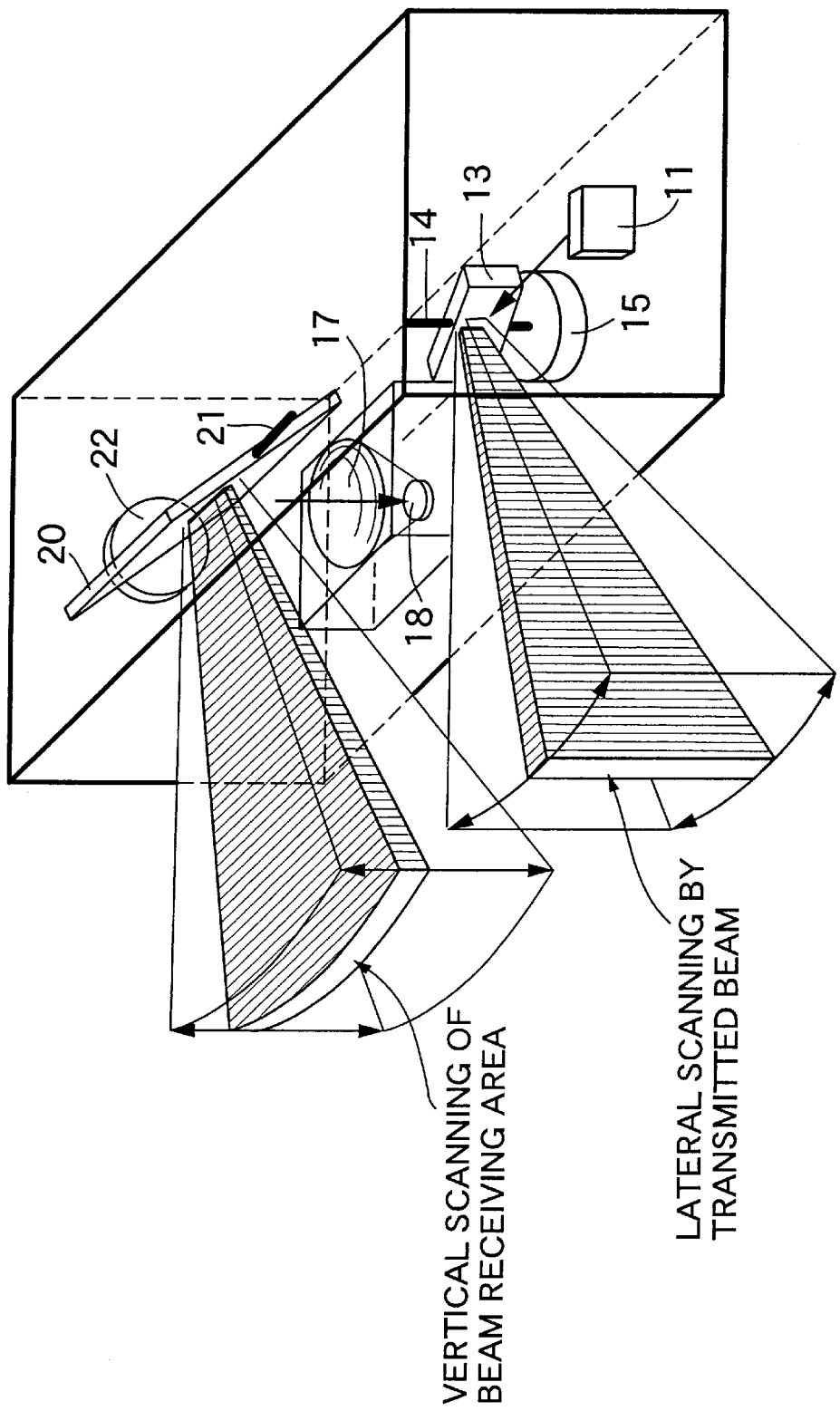

As shown in FIGS. 1 and 2, an object detecting device is operable to detect the distance between the vehicle and a target T which is, for example, a vehicle traveling ahead of the vehicle (which will be referred to as a preceding vehicle) and the direction of the preceding vehicle. The object detecting device is comprised of a beam transmitting section 1, a transmitted-beam scanning section 2, a beam receiving section 3, a received-beam scanning section 4, and a distance measuring section 5. The beam transmitting section 1 includes a laser diode 11 integrally provided with a beam transmitting lens, and a laser diode driving circuit 12 for driving the laser diode 11. The transmitted-beam scanning section 2 includes a beam transmitting mirror 13 for reflecting the laser output of the laser diode 11, a motor 15 for reciprocally turning the beam transmitting mirror 13 about a vertical axis 14, and a motor driving circuit 16 for controlling the driving of the motor 15. The laser beam output from the beam transmitting mirror 13 has a vertically elongated pattern, as a result of being limited in lateral width. The target T is scanned laterally with a period of 200 msec by this laser beam.

The beam receiving section 3 includes a beam receiving lens 17, a photo-diode 18 for receiving the reflected beam focused by the beam receiving lens 17 to convert the beam into an electric signal, and a received-beam amplifying circuit 19 for amplifying the signal output from the photo-diode 18. The received-beam scanning section 4 includes a beam receiving mirror 20 for reflecting the wave reflected from the target T to direct it to the photo-diode 18, a motor 22 for reciprocally turning the beam receiving mirror 20 about a lateral axis 21, and a motor driving circuit 23 for controling the driving of the motor 22. A beam receiving area scanned vertically with a period of 2.5 msec by the beam receiving mirror 20, has a laterally elongated pattern as a result of being limited in vertical width.

The distance measuring section 5 includes a control circuit 24 for controlling the laser diode driving circuit 12 and the motor driving circuits 16 and 23, a communication circuit 26 for conducting communication between an electronic control unit 25 for controlling a cruise control system and an automatic brake device, a memory circuit 27 for storing a laser beam receiving level signal, and a central processing unit 28 as an object detecting means for calculating a distance from the vehicle to the target T, based on data stored in the memory circuit 27.

Figure 3:
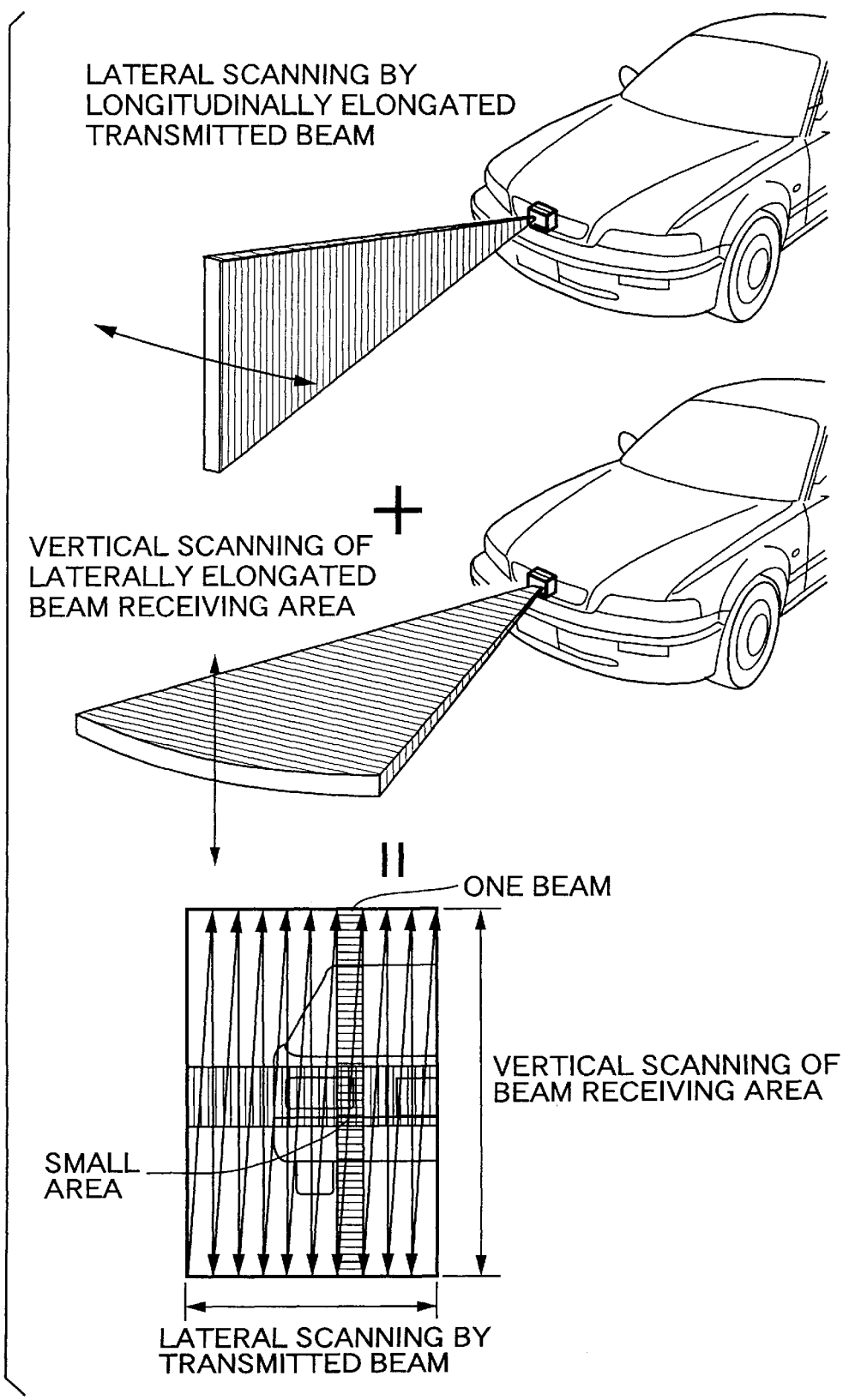
Figure 4:
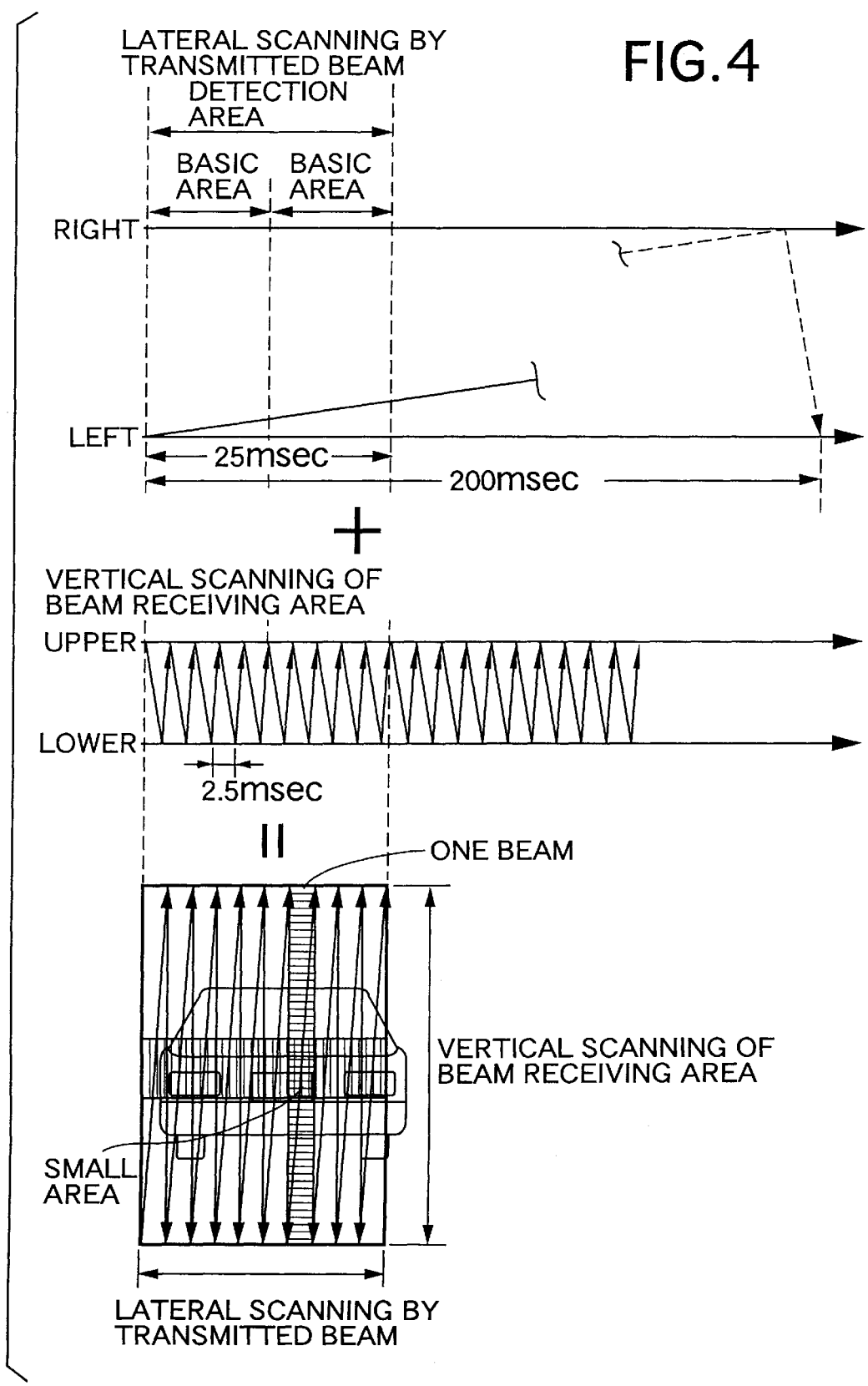

As shown in FIGS. 3 and 4, the target T is scanned laterally in a period of 200 msec by the vertically elongated laser beam from the object detecting device, and the laterally elongated beam receiving area for the object detecting device is scanned vertically in a period of 2.5 msec. A section where the laser beam and the beam receiving area intersect each other is a single small area. The overall area in which the scanning is carried out, comprises a collection of a total of 400 small areas created by longitudinally dividing the entire area into 5 sections and laterally dividing the entire area into 80 sections. The 400 small areas are scanned in a zigzag manner for 200 msec. FIG. 4 corresponds to a distance address [200].

Figure 6:
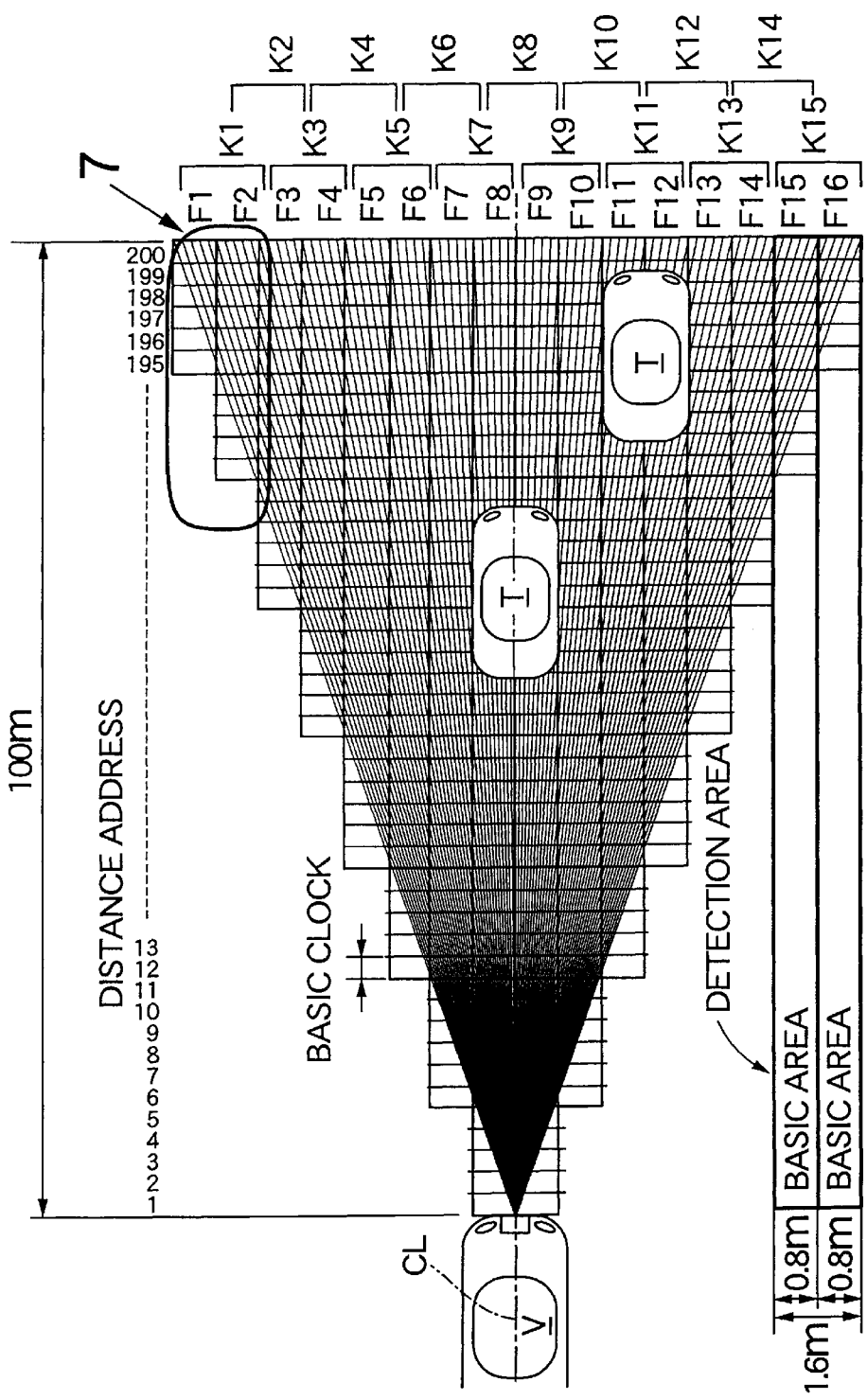

As shown in FIG. 6, the detection of the target T is carried out in a range from the vehicle V to a point 100 m in front of the vehicle V. The range from the vehicle V to the point 100 m forwards from the vehicle V is divided into a first basic area F1 to a sixteenth basic area F16 by a plurality of parallel lines drawn parallel to the vehicle body axis CL of the vehicle V and having a width of 0.8 m. The first basic area F1 to the sixteenth basic area F16 are arranged laterally symmetrically from left to the right as viewed from the vehicle V. A boundary between the eighth basic area F8 and the ninth basic area F9 coincides with the vehicle body axis CL of the vehicle V.

An area created by addition of the adjacent first and second basic areas F1 and F2 to each other is defined as a first detection area K1; an area created by addition of the adjacent second and third basic areas F2 and F3 to each other is defined as a second detection area K2; and an area created by addition of the adjacent third and fourth basic areas F3 and F4 to each other is defined as a third detection area K3. By combining the first to sixteenth basic areas F1 to F16 in the above manner, the first to fifteenth detection areas K1 to K15 are defined in a divided manner sequentially from left to right in a state in which they are overlapped with one another by 0.8 m. The width of each of the detection areas K1 to K15 is 1.6 m, which is selected as a value approximately equal to the lateral width of a common typical vehicle V. The width of each of the detection areas K1 to K15 may be increased to slightly more than 1.6 m and set on the order of the lateral width of the common typical lane.

Figure 7:
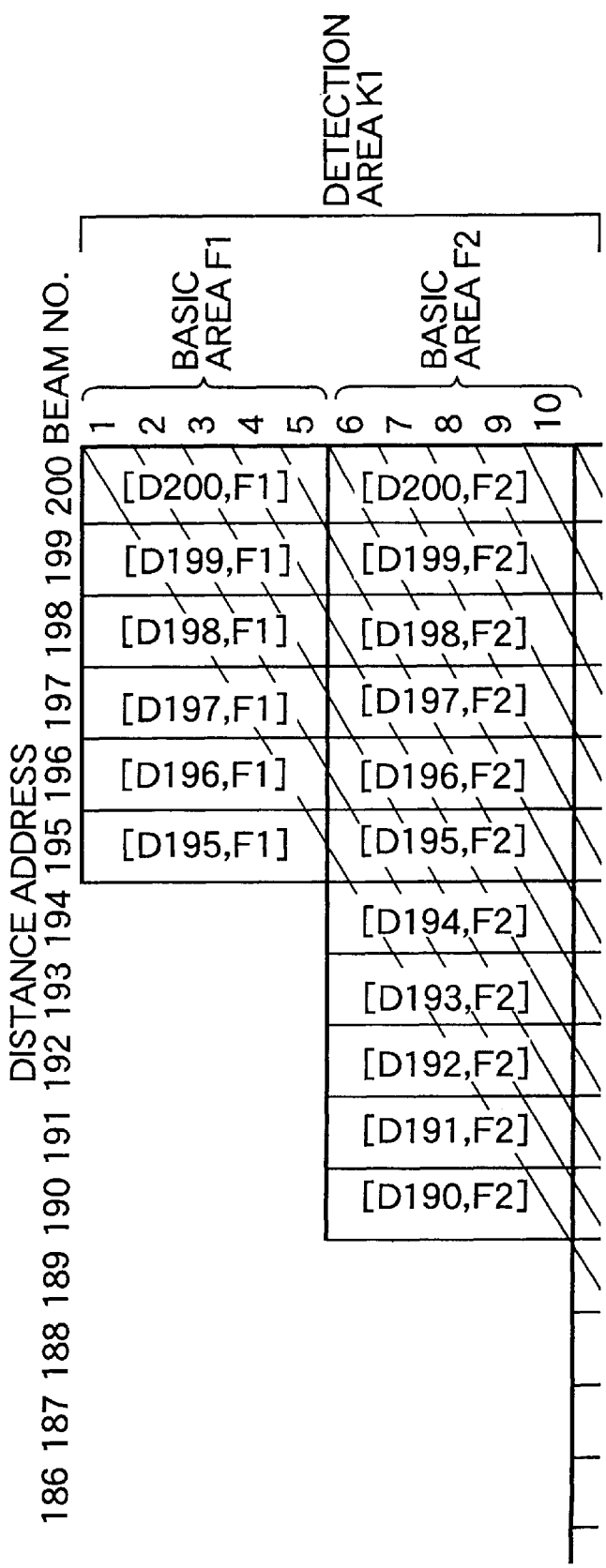

As can be seen by reference to FIG. 6 in combination with FIG. 7, the first to sixteenth basic areas F1 to F16 defined in a band shape having a width of 0.8 m are subdivided into areas of 0.5 m depending on the distance from the vehicle V, and a distance address is affixed to each area for every distance of 0.5 m. For example, the distance address [1] corresponds to the distance of 0.5 m; the distance address [2] corresponds to the distance of 1.0 m; the distance address [100] corresponds to the distance of 50.0 m; and the distance address [200] corresponds to the distance of 100.0 m. Therefore, the overall area where the detection of the target T is carried out (a triangular area in FIG. 6) is divided into fine measure-shaped regions by the basic area Nos. F1 to F16 and the distance addresses [1] to [200].

The laser beam transmitted from the vehicle V widens radiantly and hence, regions having a possibility that the target T could be detected in the first basic area F1 lying on the leftmost position, are regions corresponding to the distance addresses [195] to [200], and regions having a possibility that the target T could be detected in the second basic area F2 laterally inward adjacent the first basic area, are regions corresponding to the distance addresses [190] to [200]. Therefore, the range of the distance addresses having the possibility of detection of the target T is increased, as it is closer to the vehicle body axis CL of the vehicle V. In the adjacent eighth and ninth basic areas F8 and F9 on the opposite sides of the vehicle body axis CL of the vehicle V, there is a possibility that the target T could be detected in all the distance addresses [1] to [200].

In a region of the distance address [200] 100 m spaced apart from the vehicle V, five beams arranged laterally, are included in each of the basic areas F1 to F16. The density of the beams included in each of the basic areas F1 to F16 is increased, as the distance address is decreased (closer to the vehicle V). For example, in a region of the distance address [100] 50 m spaced apart from the vehicle V in a certain basic area, the density of the included beams is double, as compared with the density in a region of the distance address [200] 100 m spaced apart from the vehicle V.

Figure 5:
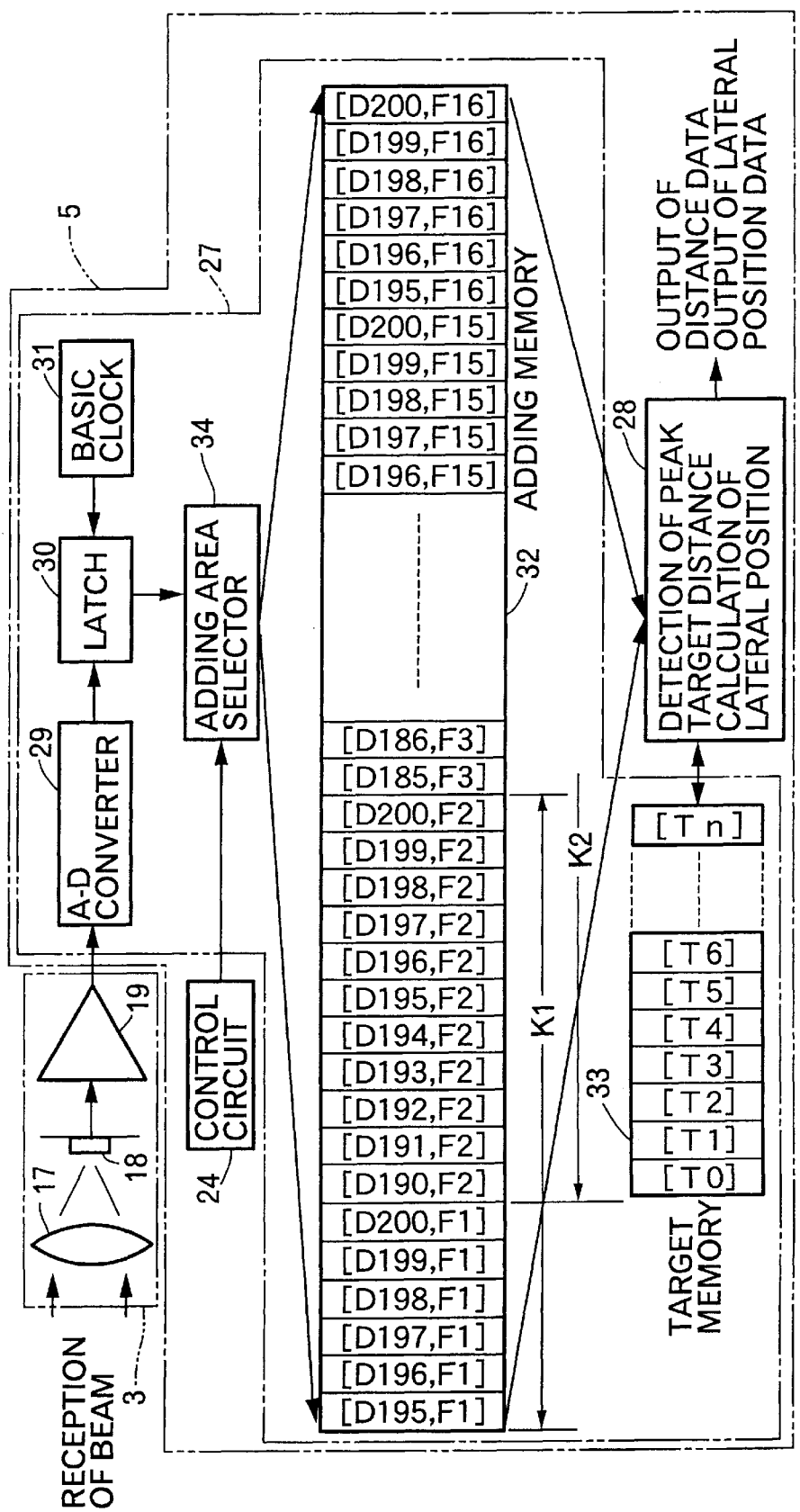

The arrangement of an essential portion of the object detecting device will be described with reference to FIG. 5.

The memory circuit 27 connected to the beam receiving section 3 includes an A–D converter 29 for conducting the A–D conversion of a reception level signal of a reflected wave received by the beam receiving section 3, a latch circuit 30 for temporarily holding the A–D converted reception level signal, and a basic clock circuit 31 for outputting a pulse signal of a given period to the latch circuit 30. An adding memory 32 is connected to the latch circuit 30 through an adding area selector 34. The adding memory 32 is comprised of RAM and includes storing regions for storing a large amount of data [D195, F1], [D196, F1], [D197, F1]—[D199, F16] and [D200, F16 ] recognized by the basic area Nos. F1 to F16 and the distance addresses [1] to [200]. The first half of the data stored in each of the storing regions corresponds to the distance addresses, and the second half corresponds to the basic area Nos. F1 to F16.

As can be seen by reference to FIG. 6 in combination with FIG. 7, the first six of the storing regions in the adding memory 32 correspond to six measures in the first basic area F1 laying at the left end, and next 11 of the storing regions correspond to 11 measures in the second basic area F2. The adding area selector 34 which is connected to the control circuit 24 determines the distance from the vehicle to the target T which has reflected the laser beam to the target T and the direction of the target T, based on the direction of transmission of the laser beam and the time lag from the transmission to the reception of laser beam, whereby the A–D converted reception level signal is stored in any storing region in the adding memory 32 which corresponds to the distance and direction of the target T. The distance of 0.5 m which is the spacing for recognizing the distance of the target T, corresponds to the period of the pulse signal output by the basic clock circuit 31.

The central processing unit 28 calculates the distance and lateral position of the target T based on the data stored in the adding memory 32. To store the calculated distance and lateral position of the target T, a target memory 33 comprising a RAM is connected to the central processing unit 28. The target memory 33 includes storing regions for storing data [T0], [T1]—for the distances and lateral positions of a plurality of targets T. When a plurality of targets T are detected, the distances and lateral positions of the targets T are sequentially stored in the storing regions.

A procedure for adding the reception level signals in the small areas to one another to store them in the adding memory 32 by the adding area selector 34 will be described below. The detection of the target T is carried out for each of the first to fifteenth detection areas K1 to K15, and the detection of the target T in the first detection area K1 will be described as an example. The first detection area K1 is the first basic area F1 plus the second basic area F2, and the adding memory 32 includes storing regions for storing seventeen data points [D195, F1], [D196, F1], —[D199, F2] and [D200, F2] corresponding to the first detection area K1 (see FIG. 5).

FIG. 6 shows one horizontal section of the first to fifteenth detection areas K1 to K15. In fact, the small areas included in each of the detection areas K1 to K15 are vertically superposed one on another in five layers and hence, five small areas per beam are included.

As can be seen from FIG. 7, for example, the data [D200, F1] stored in the storing region of the distance address [200] in the first basic area F1 comprises those reception level signals from the 25 small areas corresponding to the beam Nos. 1 to 5, which are added together. The content of such data is represented by [D200, F1]=Σ (B1:B5)/25. This corresponds to an average value provided by adding the reception level signals from the distance address [200] in the 25 small areas for the beam Nos. 1 to 5 to one another, and dividing the resulting value by 25.

Likewise, the data [D199, F1] stored in the storing region of the distance address [199] in the first basic area F1 comprises those reception level signals from the 20 small areas corresponding to the beam Nos. 1 to 4, which are added together, and the content of such data is represented by [D200, F1]=Σ (B1:B4)/20. This corresponds to an average value provided by adding the reception level signals from the distance address [199] in the 20 small areas for the beam Nos. 1 to 4 to one another, and dividing the resulting value by 20.

Likewise, the data [D200, F2] stored in the storing region of the distance address [200] in the second basic area F2 comprises those reception level signals from the 25 small areas corresponding to the beam Nos. 6 to 10, which are added together, and the content of such data is represented by [D200, F2]=Σ (B6:B10)/25. This corresponds to an average value provided by adding the reception level signals from the distance address [200] in the 25 small areas for the beam Nos. 6 to 10 to one another, and dividing the resulting value by 25.

The central processing unit 28 reads the data [D195, F1], [D196, F1]—[D199, F2] and [D200, F2] stored in the 17 storing regions corresponding to the first and second basic areas F1 and F2, and calculates the 11 data points [D190, K1], [D191, K1], [D192, K1], [D192, K1]—[D199, K1] and [D200, K1] in the first detection area K1 created by addition of the first and second basic areas F1 and F2 to each other, based on such read data.

As can be seen from FIG. 7, the five data points [D190, K1], [D191, K1]—[D194, K1] in the first detection area K1 which are closer to the vehicle V include only the second basic area F2 without including the first basic area F1 and hence, these five data points [D190, K1], [D191, K1]—[D194, K1] are five data points [D190, F2], [D191, F2]—[D194, F2] themselves in the second basic area F2.

On the other hand, the six data points [D195, K1], [D196, K1]—[D200, K1] in the first detection area K1 which are farther from the vehicle V include both of the first and second basic areas F1 and F2 and hence, each of the six data points [D195, K1], [D196, K1]—[D200, K1] is an average value provided by adding the six data points [D195, F1], [D196, F1]—[D200, F1] in the first basic area F1 to the six data points [D195, F2], [D196, F2]—[D200, F2] in the second basic area F2 and dividing the resulting value by 2.

For example, the data [D200, K1] in the distance address [200] in the first detection area K1 is an average value provided by adding the data [D200, F1] in the first basic area F1 and the data [D200, F2] in the second basic area F2 to each other and then dividing the resulting value by 2, and represented by [D200, K1]=([D200, F1]+[D200, F2])/2.

When the calculation of the eleven data points [D190, K1], [D191, K]—[D200, K1] in the first detection area K1 is completed in the above manner, a peak point is extracted. If the eleven data points are

[D190, K1]=20
[D191, K1]=15
[D192, K1]=42
[D193, K1]=80 (peak point)
[0194, K1]=60
[D195, K1]=37
[D196, K1]=20
[D197, K1]=30
[D198, K1]=27
[D199, K1]=16
[D200, K1]=18, data [D193, K1] exceeding a preset threshold value (e.g., 70) is a peak point.

This means that the target T is detected as existing in the direction of the first detection area K1 and at a distance corresponding to the distance address [193] (96.5 m ahead of the vehicle V).

The peak points are extracted in all the detection areas K1 to K15, and the distances and lateral positions of the target T corresponding to the peak points are stored in the plurality of storing regions in the target memory 33.

Figure 8:
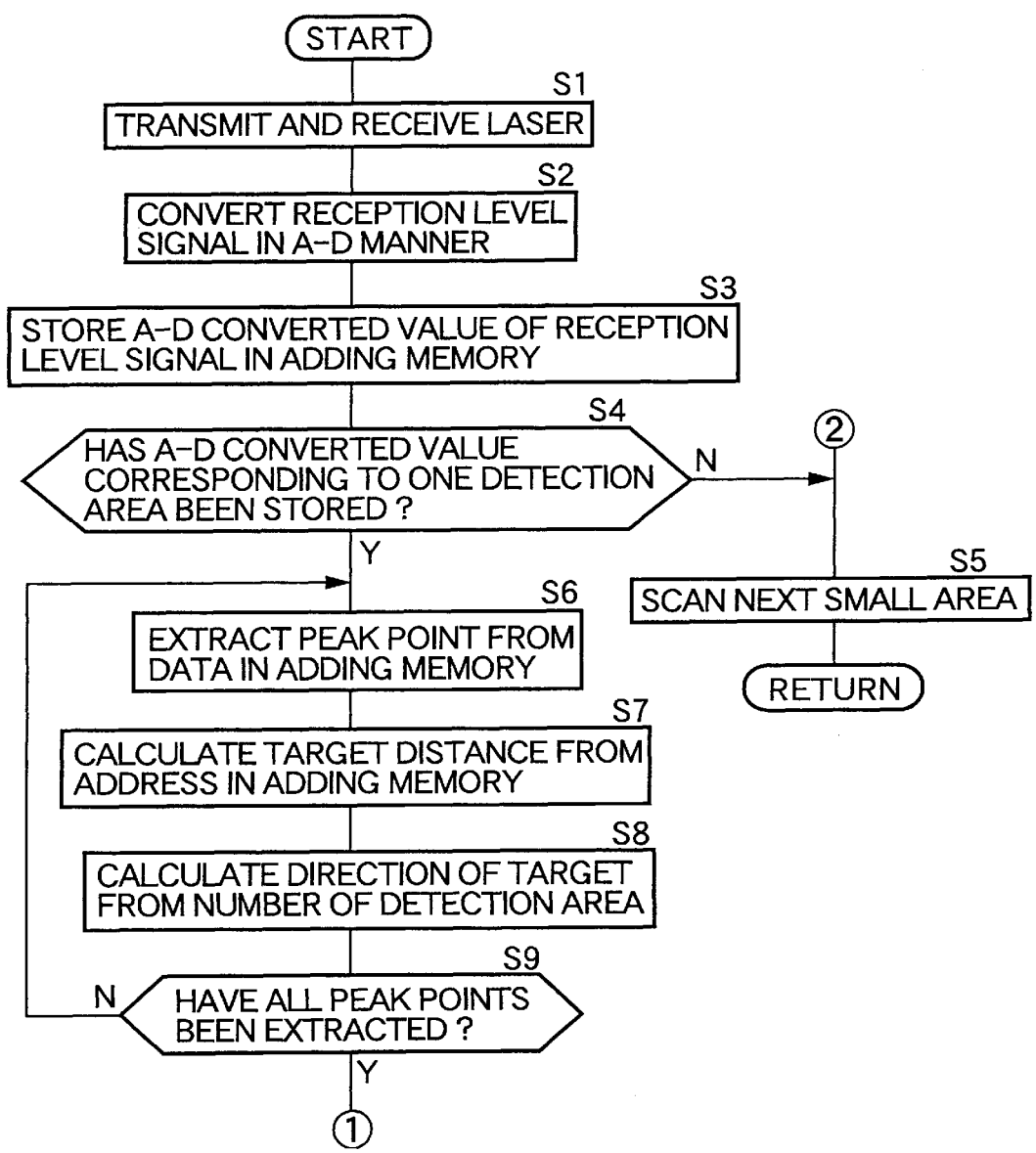
Figure 9:
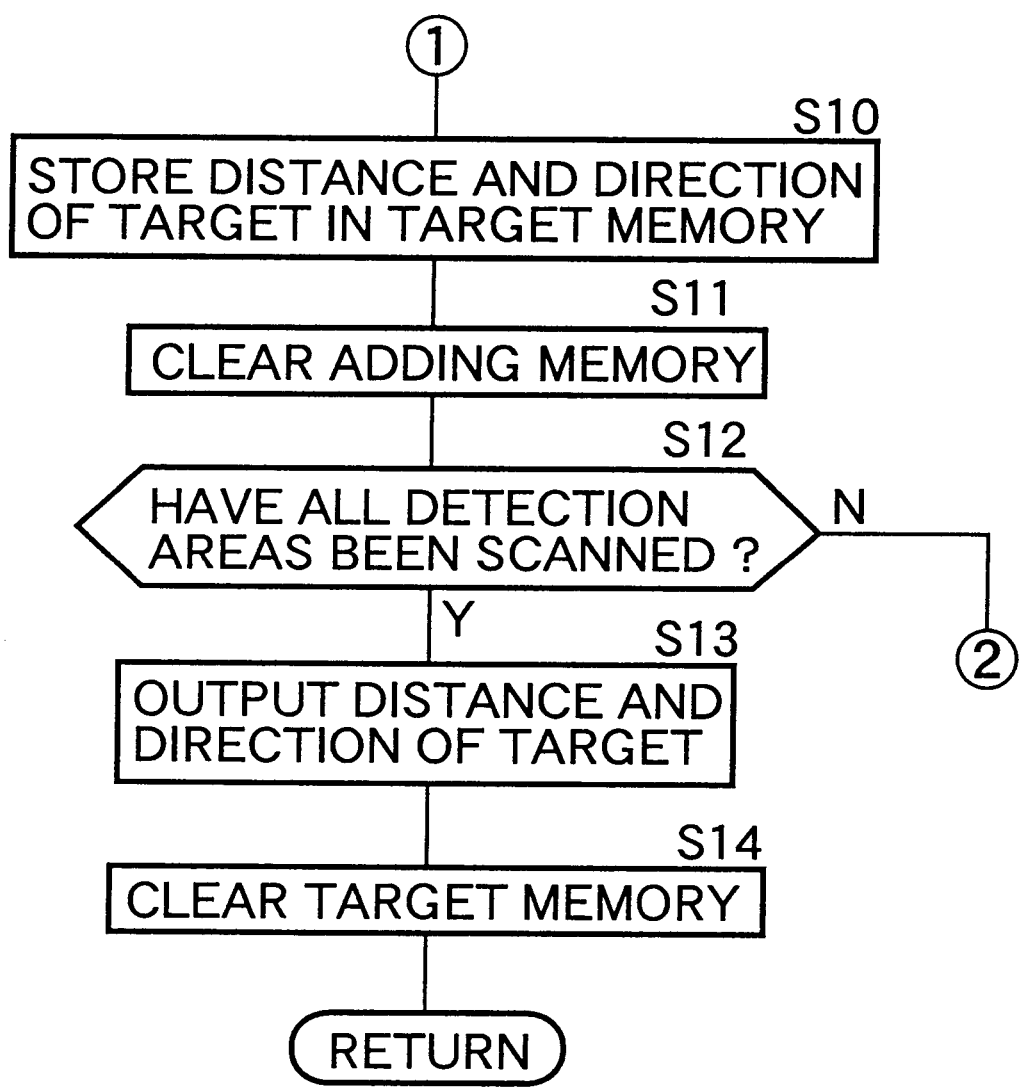

The above-described operation will be further described with reference to flow charts in FIGS. 8 and 9.

First, at Step S1, the transmission of the laser beam and the reception of the reflected wave for one small area are carried out. At Step S2, the reception level or received signal of the reflected wave received is converted by the A–D converter 29 for every pulse signal output by the basic clock circuit 31. At Step S3, the A–D converted data is stored in that predetermined storing region in the adding memory 32 which is assigned by the adding area selector 34. More specifically, when the reflected wave from the target T, for example, lying at a position corresponding to a distance of 97.0 m in the second basic area F2, is received, the data [D194, F2] provided by A–D converting the reception level signal of the reflected wave is stored in the corresponding storing region in the adding memory 32. At this time, the magnitude of the stored data (the A–D converted value of the reception level signal) corresponds to the magnitude of the reception level signal of the reflected wave. Steps S1 to S3 are repeatedly carried out, until the scanning of all the small areas included in the first detection area K1 is completed (see Steps S4 and S5).

When the scanning of the first detection area K1 is completed, one of the data points in the first detection area K1 stored on the adding memory 32 which exceeds the preset threshold value is extracted as a peak point at Step S6. At Step 7, if for example, the data [D193, K1] is the peak point, the target T is detected as existing 96.5 m ahead of the vehicle V in the direction of the first detection area K1, as described above. The number of targets T detected in one detection area is not limited to one, and a plurality of targets T may be detected at different distances in some cases.

When the extraction of all the peak points in the first detection area K1 is completed at Step S9, the distances and lateral positions of the targets T corresponding to the extracted peak points are stored in the storing regions in the target memory 33 at Step S10. If for example, three peak points are extracted in the first detection area K1, the extracted data points are stored in the three storing regions [T0], [T1] and [T2] in the target memory 33. The adding memory 32 is cleared at Step S11.

When the detection of the object in the first detection area K1 is completed in the above manner, the detection of objects in the second to fifteenth detection areas K2 to K15 is sequentially carried out in a similar manner. As a result, if the detection of all the objects in the first to fifteenth detection areas K1 to K15 is completed at Step S12, the data for the distances and lateral positions of the targets T stored in the target memory 33 are output to, for example, a cruise control device or an automatic brake device at Step S13, and then, the target memory 33 is cleared at Step S14.

Even if the laser beam is diffused radiantly from the vehicle V, it is possible to detect the target T by adding the reception level signals of the reflected waves from substantially the entire surface of the target T without influence by the distance of the target T, leading to a remarkably enhanced detection ability, because the lateral width of each of the detection areas K1 to K13 is always set at a constant value (1.6 m) irrespective of the distance from the vehicle V. The plurality of detection areas K1 to K15 having the lateral width of 1.6 m which is substantially equal to the lateral width of the vehicle V, are disposed in such a manner that they are overlapped by one another by 0.8 m, and hence, the entire target T can be reliably detected irrespective of the lateral position of the target T necessarily through the covering-up by any of the detection areas K1 to K15.

In the prior art object detecting device, if a target T has no reflector, or is stained, the target cannot be detected, because a sufficient reception level signal is not obtained. In the present embodiment, however, even if the reception level signals in the individual small areas are small, the target T can be reliably detected by comparing a value provided by addition of these reception level signals with the threshold value.

In addition, in the prior art object detecting device, rain or snow may be detected in an area between the vehicle and a target T during rain or snow, thereby making it impossible to detect the target T itself. In the present embodiment, however, the influence of the rain and snow can be eliminated, thereby making it possible to reliably detect the target T. This is because the rain or snow distance is random and hence, a value provided by adding the reception level signal cannot exceed the threshold value, but a target T having a size larger than the rain or snow necessarily exists astride a plurality of small areas and hence, the value provided by adding the reception level signal exceeds the threshold value.

Further, in the prior art object detecting device, when a plurality of targets T are in a common detection area, if the value provided by addition of reception level signals of reflected waves from the first target T exceeds the threshold value, the addition of the reception level signals is discontinued at that time point. Therefore, the second and third targets T cannot be detected. However, in the present embodiment, the reception level signals of the reflected waves in all the small areas included in each of the detection areas K1 to K15 are added together and then, a value provided by addition of these reception level signals is compared with the threshold value and hence, it is possible to detect the plurality of targets T (see Steps S6 to S8 in the flow chart in FIG. 8).

A second embodiment of an object detecting device will now be described with reference to FIGS. 10 to 13.

Figure 10:
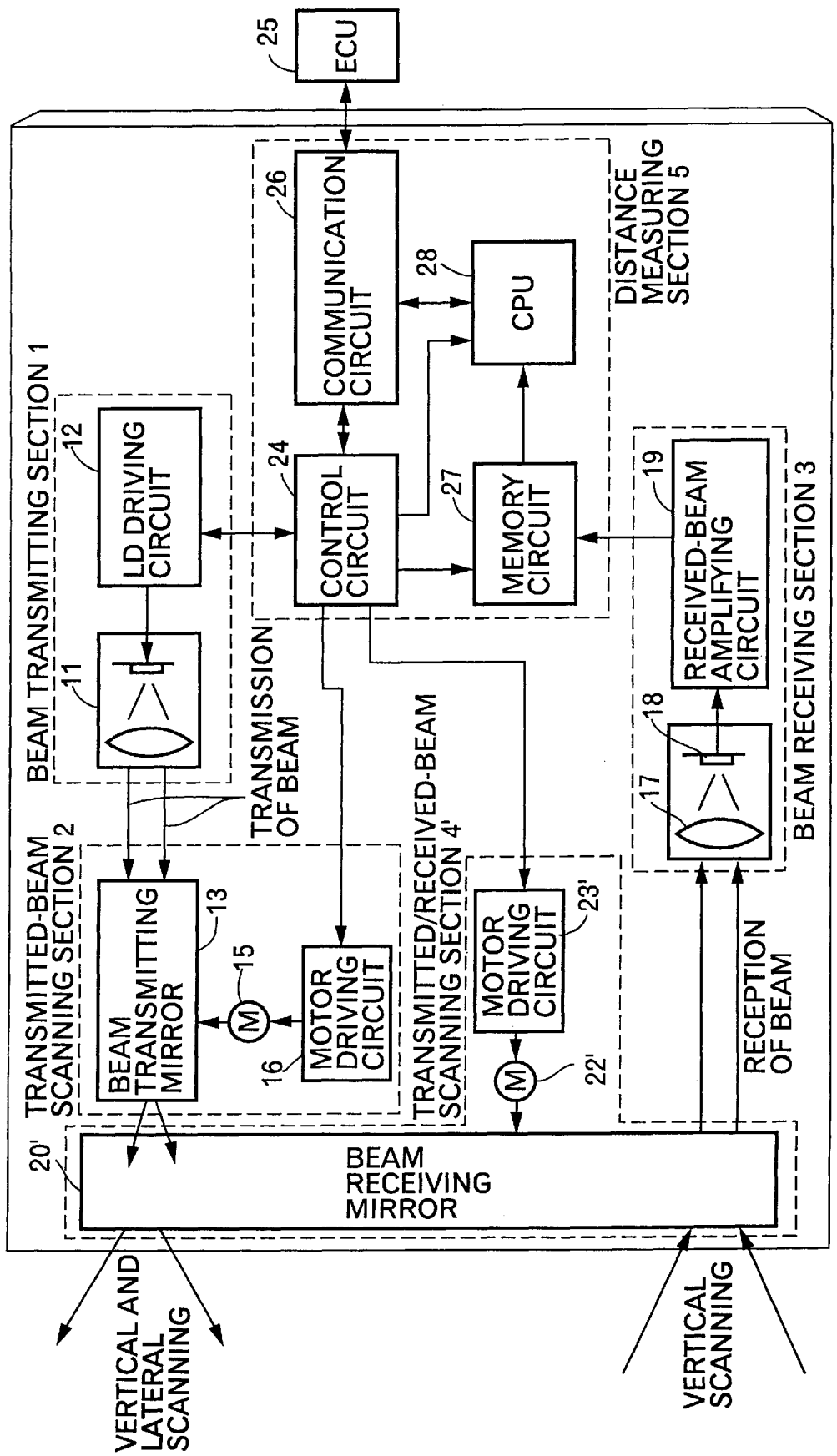
Figure 11:
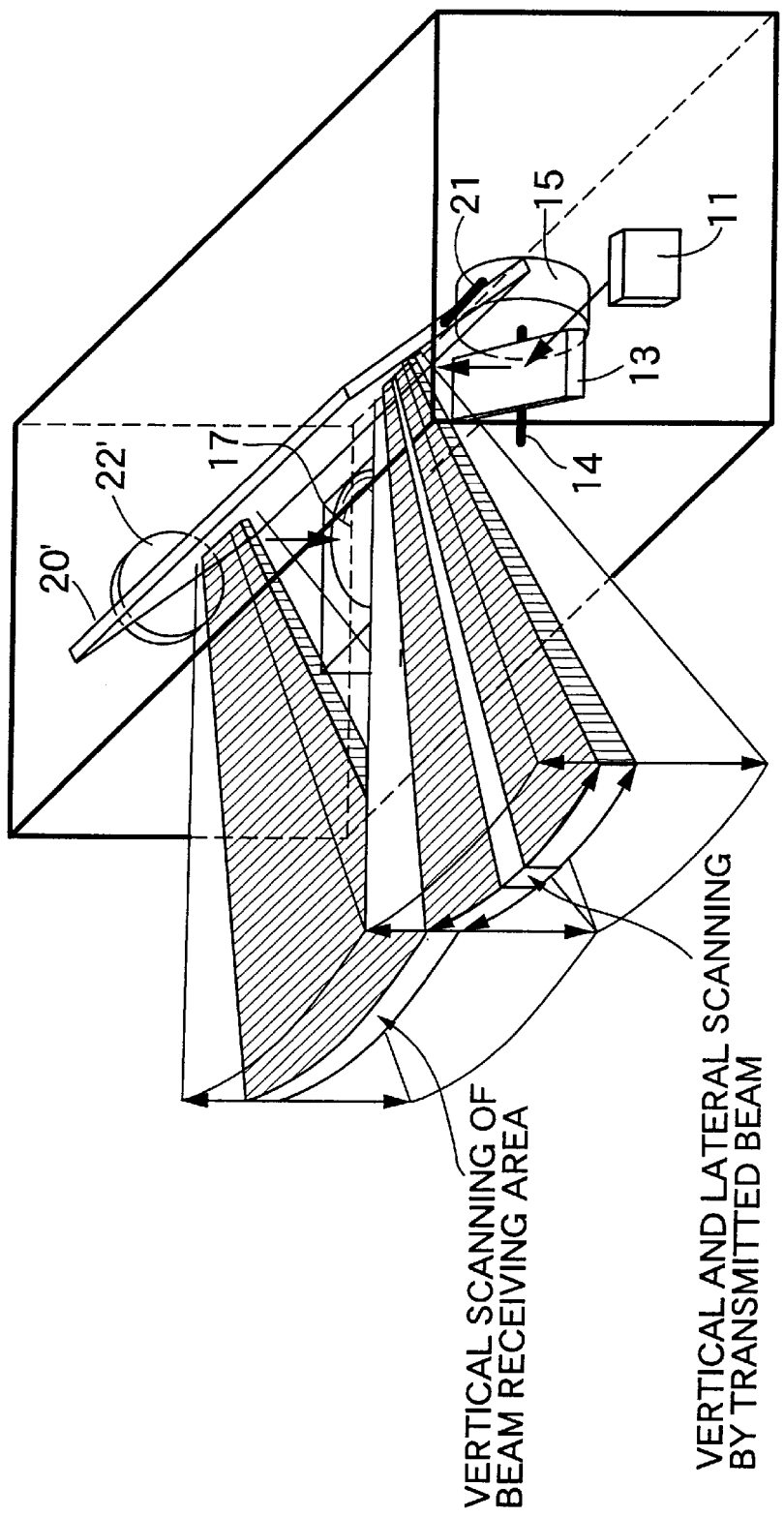

As can be seen by comparison of the first embodiment shown in FIGS. 1 and 2 with the second embodiment shown in FIGS. 10 and 11, the object detecting device according to the second embodiment of the present invention includes a transmitted and received-beam scanning section 4' in place of the received-beam scanning section 4 of the object detecting device according to the first embodiment. The transmitted and received-beam scanning section 4' includes a beam transmitting and receiving mirror 20', a motor 22' for reciprocally turning the beam transmitting and receiving mirror 20' about a lateral axis 21', and a motor driving circuit 23' for controlling the driving of the motor 22'. A laser beam reflected on the beam transmitting mirror 13 is reflected again by the beam transmitting and receiving mirror 20', and the target T is scanned laterally and vertically by the spot-like laser beam limited in vertical and lateral widths.

Figure 12:
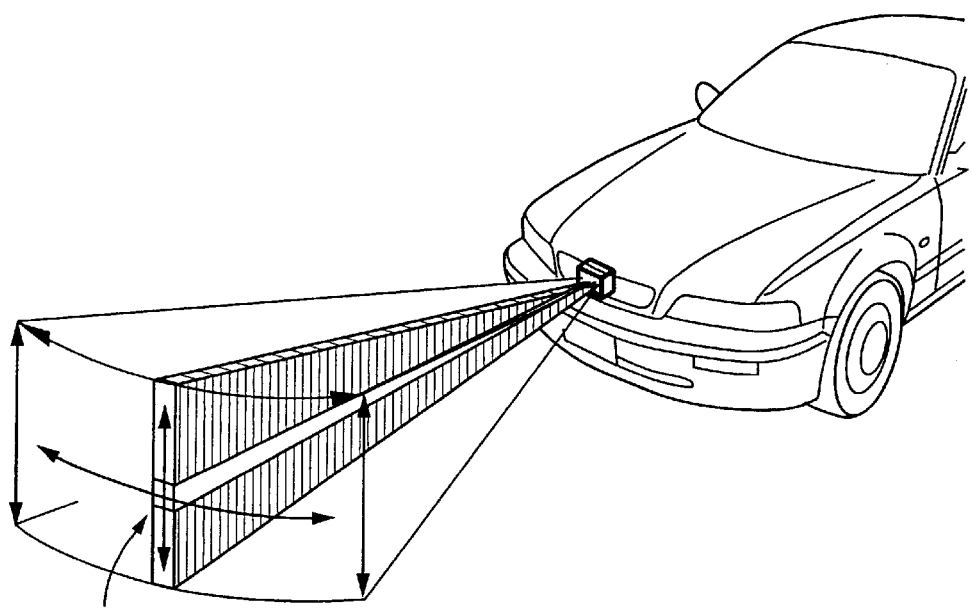
Figure 13:
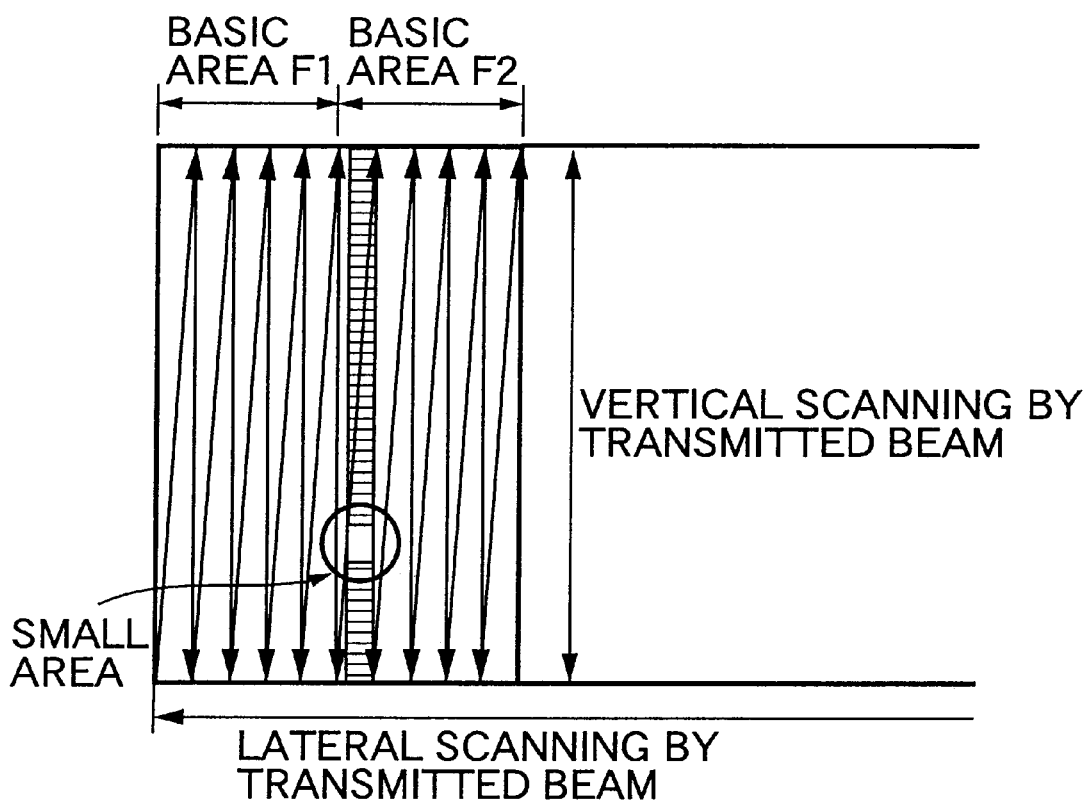
Figure 14:
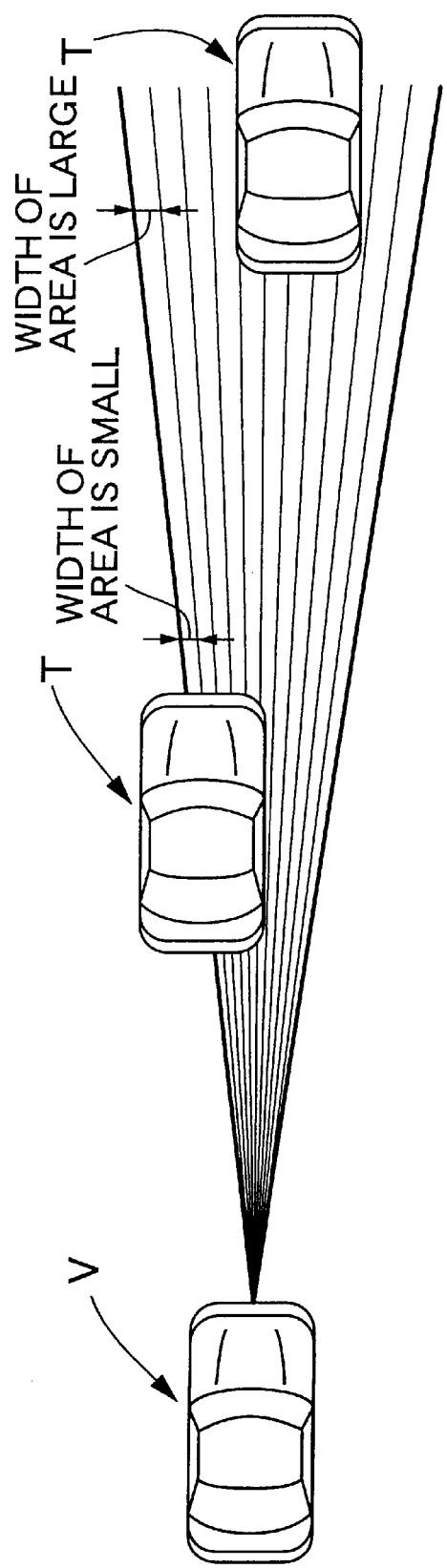
FIG. 14 is an illustration for explaining the prior art.

As shown in FIGS. 12 and 13, the period of laterally scanning with the laser beam by the reciprocal turning movement of the beam transmitting mirror 13 is 200 msec, and the period of vertically scanning with the laser beam by the reciprocal turning movement of the beam transmitting and receiving mirror 20' is 2.5 msec. By vertically scanning the beam receiving area by the reciprocal turning movement of the beam transmitting and receiving mirror 20', the vertically scanning period in the beam receiving area is also 2.5 msec which is equal to the period of vertically scanning with the laser beam. FIG. 13 corresponds to the distance address [200].

As in the first embodiment, the entire area for detecting the target T comprises a collection of a total of 400 small areas formed by vertically dividing the entire area into five sections and laterally dividing the entire area into 80 sections. The 400 small areas are scanned in a zigzag manner for 200 msec. Even according to the second embodiment, a function and an effect similar to that in the first embodiment can be achieved.

The object detecting device according to each of the embodiments uses the laser, but other electromagnetic waves such as a millimeter wave can be used in place of the laser. In addition, the number of the small areas forming the entire area for detecting the target is not limited to the 400 in the disclosed embodiments. Further, the target T is not limited to the preceding vehicle, and may be any object on the road.

Although the embodiments of the present invention have been described, it will be understood that the present invention is not limited to the above-described embodiments, and various modifications in design may be made without departing from the spirit and scope of the invention defined in claims.

What is claimed is:

1. An object detecting device for detecting an object by transmitting an electromagnetic wave, and receiving a reflected wave produced by reflection of the transmitted electromagnetic wave from the object, said device comprising a transmitting and receiving means for transmitting an electromagnetic wave and receiving the reflected wave in each of a plurality of small areas into which an area for detecting the object has been divided, an adding means for adding signals indicative of reception levels of the reflected waves in a plurality of basic areas defined by grouping adjacent ones of said small areas each having a predetermined lateral width, in accordance with a time lag from the transmission to the reception of said waves, and object detecting means for detecting a distance from the object detecting device to the object, based on the result of the addition by said adding means.

2. An object detecting device according to claim 1, wherein said transmitting and receiving means transmits electromagnetic waves sequentially in a lateral direction, and said object detecting means detects a lateral position of the object based on the timing of the transmission of the electromagnetic waves to said small areas.

3. An object detecting device according to claim 1 or 2, wherein a plurality of detection areas are established by grouping adjacent ones of said plurality of basic areas together, and said adding means adds the signals indicative of reception levels of the reflected waves in the detection areas in accordance with the time lag from the transmission to the reception of said waves.

4. An object detecting device according to claim 3, wherein said object detecting means detects the lateral position of the object based upon the lateral position of a detection area in which the object has been detected.

5. An object detecting device according to claim 3, wherein said plurality of detection areas are formed in an overlapped pattern wherein each area is overlapped with the adjacent area by one half by sequentially grouping the adjacent two basic areas.

6. An object detecting device according to claim 3, wherein said object detecting device is mounted on a vehicle to detect an object existing ahead of the vehicle in the direction of movement of the vehicle, and wherein the lateral width of said detection area is set based on the lateral width of the vehicle.

7. An object detecting device according to claim 6, wherein the lateral width of said detection area is set to be substantially equal to the lateral width of the vehicle.

8. An object detecting device according to claim 3, wherein said object detecting device is mounted on a vehicle to detect an object existing ahead of the vehicle in the direction of movement of the vehicle, and wherein the lateral width of said detection area is set based on the lateral width of a lane of the road on which the vehicle is traveling.

9. An object detecting device according to claim 8, wherein the lateral width of said detection area is set to be substantially equal to the lateral width of the lane.

* * * * *